INVENTORS S. DARLINGTON
C. H. TOWNES
D. E. WOOLDRIDGE
BY
ATTORNEY

April 13, 1948.   S. DARLINGTON ET AL   2,439,381
COMPUTING BOMBSIGHT
Filed July 17, 1943   6 Sheets-Sheet 2

INVENTORS  S. DARLINGTON
C. H. TOWNES
D. E. WOOLDRIDGE

BY

ATTORNEY

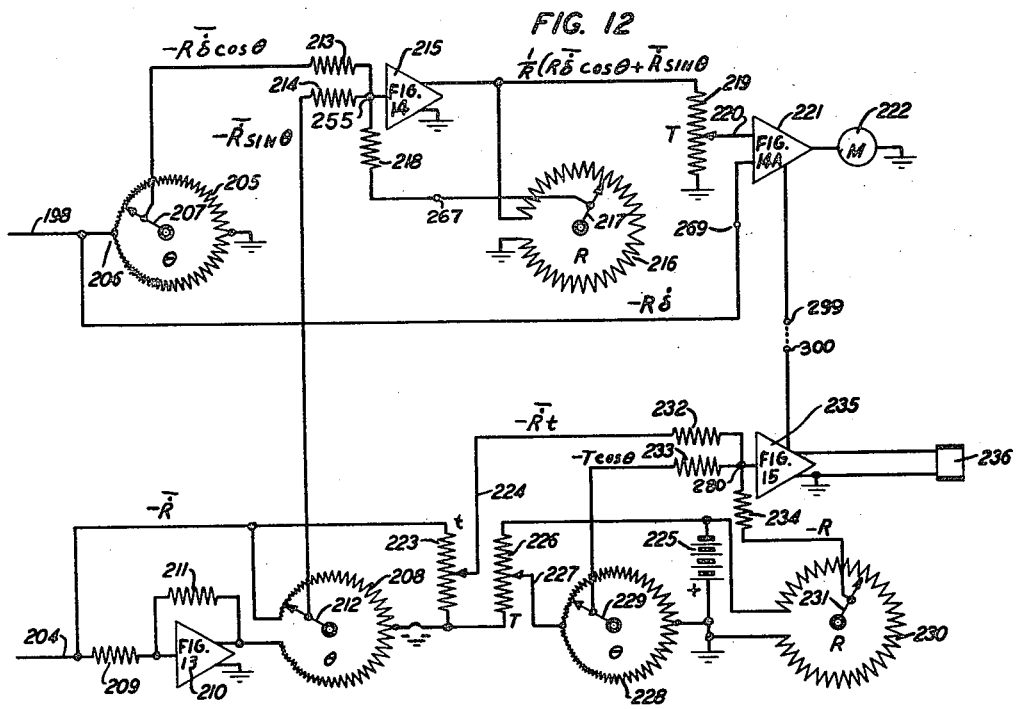
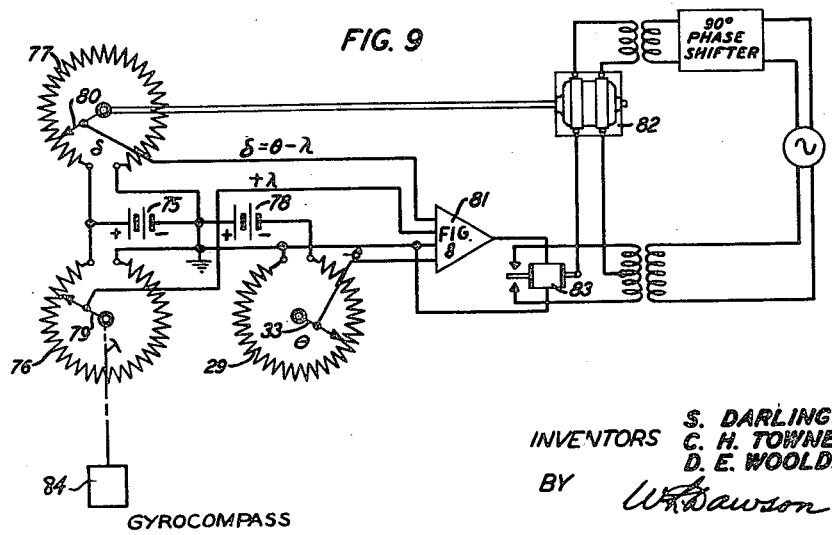

INVENTORS: S. DARLINGTON
C. H. TOWNES
D. E. WOOLDRIDGE

BY W. L. Dawson

ATTORNEY

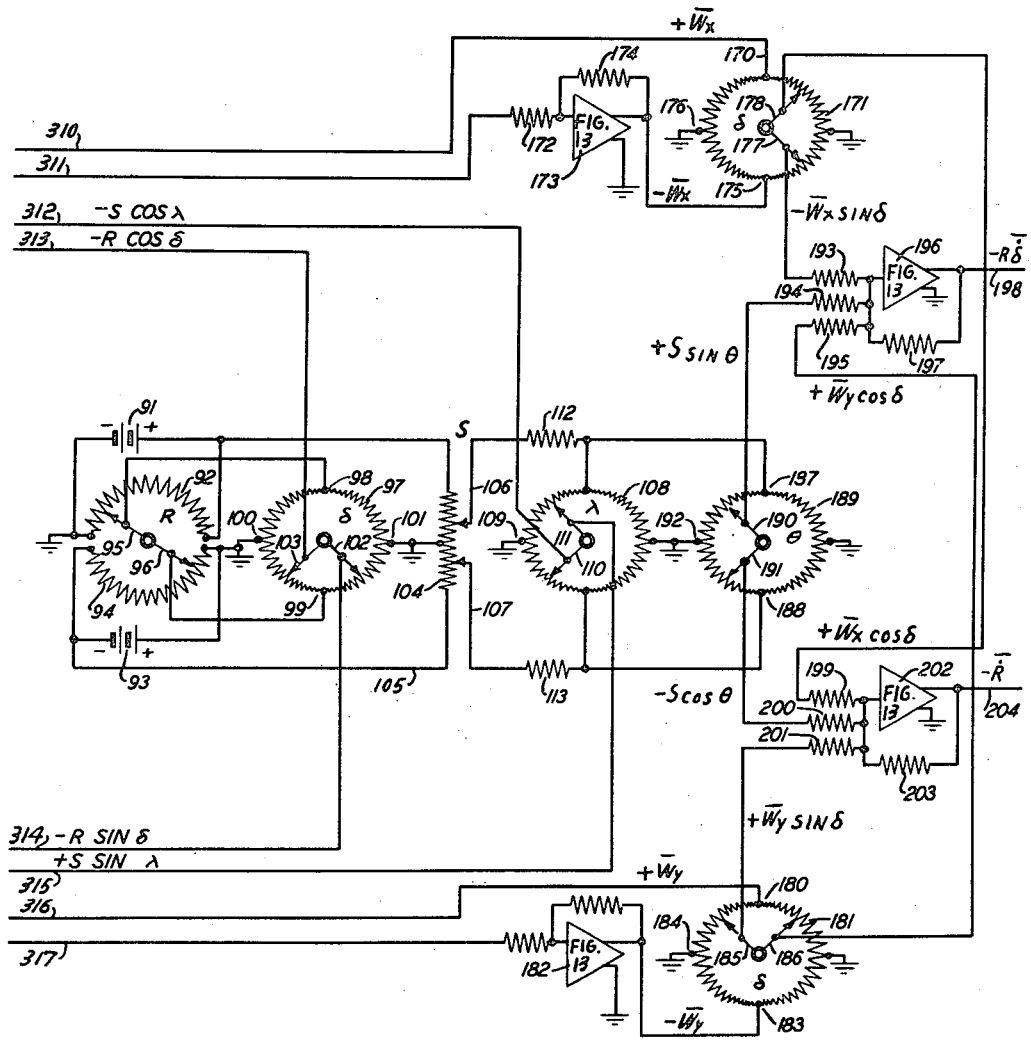

April 13, 1948.  S. DARLINGTON ET AL  2,439,381
COMPUTING BOMBSIGHT
Filed July 17, 1943  6 Sheets-Sheet 6
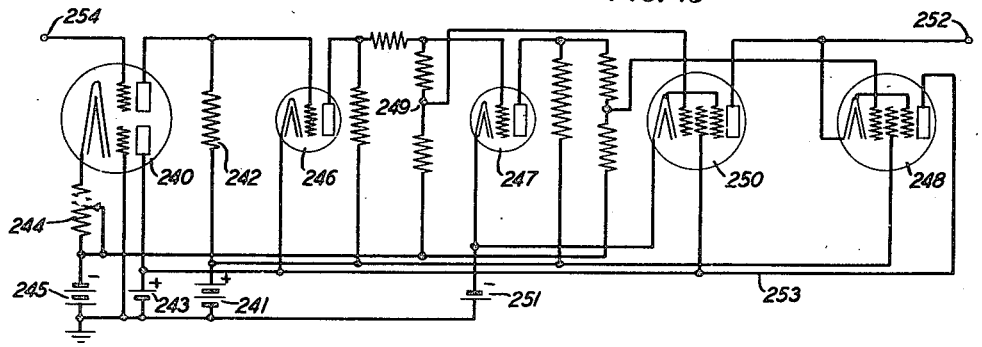
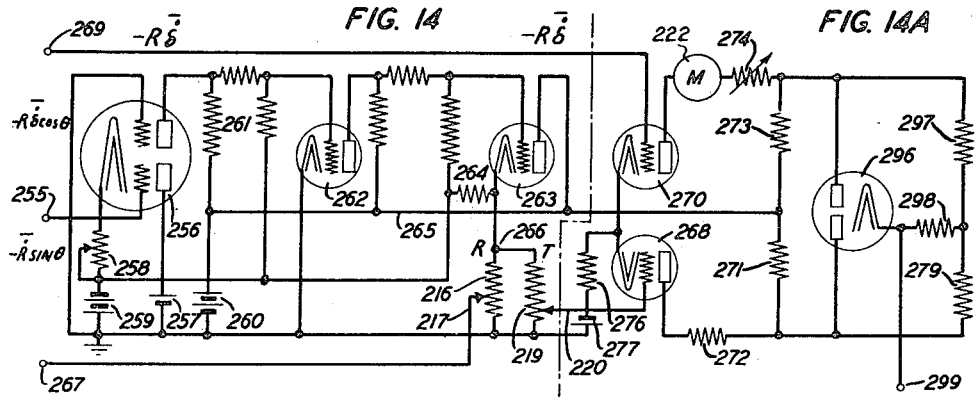
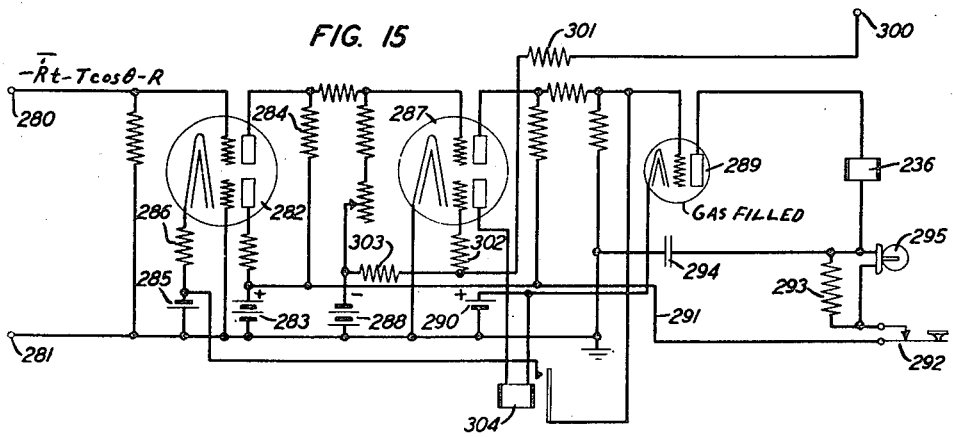
INVENTORS: S. DARLINGTON
C. H. TOWNES
D. E. WOOLDRIDGE
BY W. H. Dawson
ATTORNEY Patented Apr. 13, 1948

2,439,381

UNITED STATES PATENT OFFICE 2,439,381

COMPUTING BOMB SIGHT

Sidney Darlington, New York, N. Y., and Charles H. Townes, Mendham, and Dean E. Wooldridge, Chatham, N. J., assignors to Bell Telephone Laboratories, Incorporated, New York, N. Y., a corporation of New York Application July 17, 1943, Serial No. 495,130

7 Claims. (Cl. 33—46.5)

This invention relates to a computer associated with an aerial bombsight, and particularly to a computer in which the data are represented in the form of electrical quantities.

The object of the invention is means for indicating the correct course to be flown by an aerial vehicle, and for indicating the correct point at which to release a bomb, so that the bomb will fall on a target.

A feature of the invention is means for combining varying observed velocity data to give derived velocity components which should be constant.

Another feature of the invention is means for smoothing the electrical quantities representing the constant derived velocity components. The degree of smoothing increases during the course of a bombing run so as to produce an averaging effect on the data which weights late observations more heavily than early ones, in a controlled fashion.

Another feature of the invention is the derivation from the smoothed electrical quantities representing the constant velocity components of other electrical quantities that make possible a comparison of the ratio between the deflection component of the horizontal ground speed and the range component of the horizontal ground speed and the ratio between the deflection component of the displacement of the plane from its predicted position at the instant of impact and the range component of the same displacement; and the comparison of these electrical quantities, whereby equality of these quantities indicates the correct track to be flown by the aerial vehicle. The ground speed is really the speed of the airplane with respect to the target, which may or may not be stationary.

A further feature of the invention is the derivation from the smoothed electrical quantities representing the constant velocity components of electrical quantities proportional to the range component of the displacement of the aerial vehicle from its predicted position at the instant of impact of the bomb, and of electrical quantities proportional to the range component of the displacement of the aerial vehicle during the predicted time of fall of the bomb, and the comparison of these electrical quantities, whereby equality of these quantities indicates the correct time to release the bomb.

The present computer is associated with a bombsight capable of continuously measuring an azimuth angle and a distance. The azimuth angle is measured from some assumed vertical plane at the aerial vehicle to the vertical plane through the line of sight. The reference plane may conveniently be taken to be the vertical plane that includes the head to tail axis of the aerial vehicle, and the azimuth angle may be measured clockwise. The distance is the slant distance from the vehicle or airplane to the target. The bombsight may be an optical instrument including a theodolite for measuring the azimuth angle and an optical range finder for measuring the distance, a radio locating equipment capable of measuring the azimuth angle and slant distance or a combination of optical and radio devices. The range finder may also be used to measure height or elevation of the airplane above the surface of the earth. The measurement of height, and the continuous measurements of azimuth angle and slant distance are supplied as voltages to the computer, together with information in the form of voltages representing the vector velocity of the airplane with respect to the air and the ballistic characteristics of the bomb used, and the computer continuously indicates the correct course to be flown, and the correct instant to drop the bomb so as to strike the target.

The operation of the computer will be better understood from the drawings, in which:

Fig. 1 shows the geometrical relationships, projected on a horizontal plane through the vehicle;

Fig. 2 shows the geometrical relationships projected on a vertical plane through the vehicle and the target;

Figure 6:
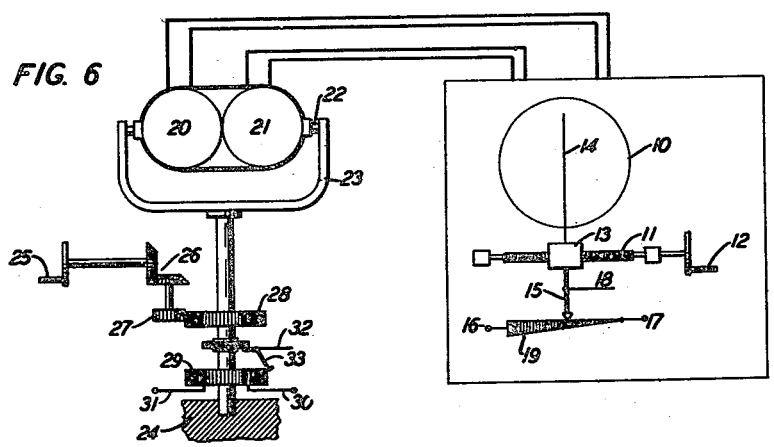
Figure 7:
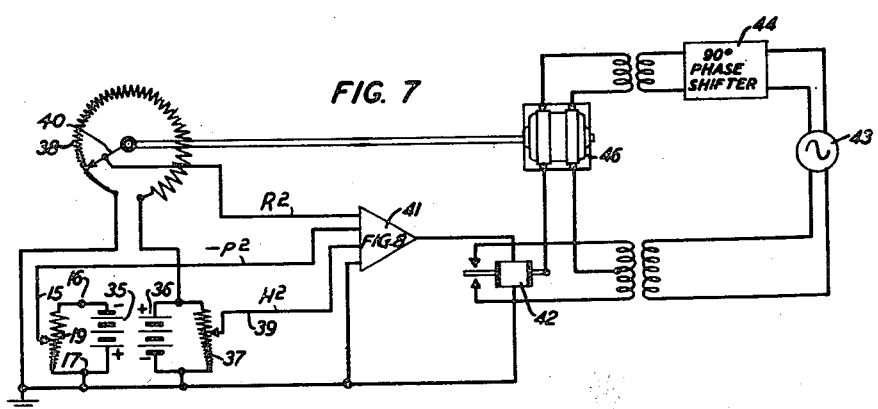
Figure 8:
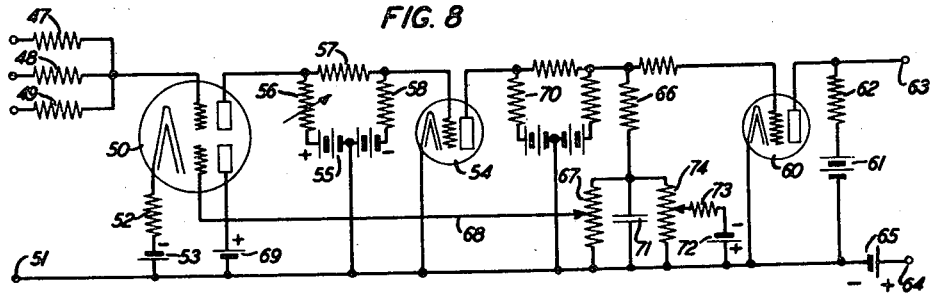
Figure 10:
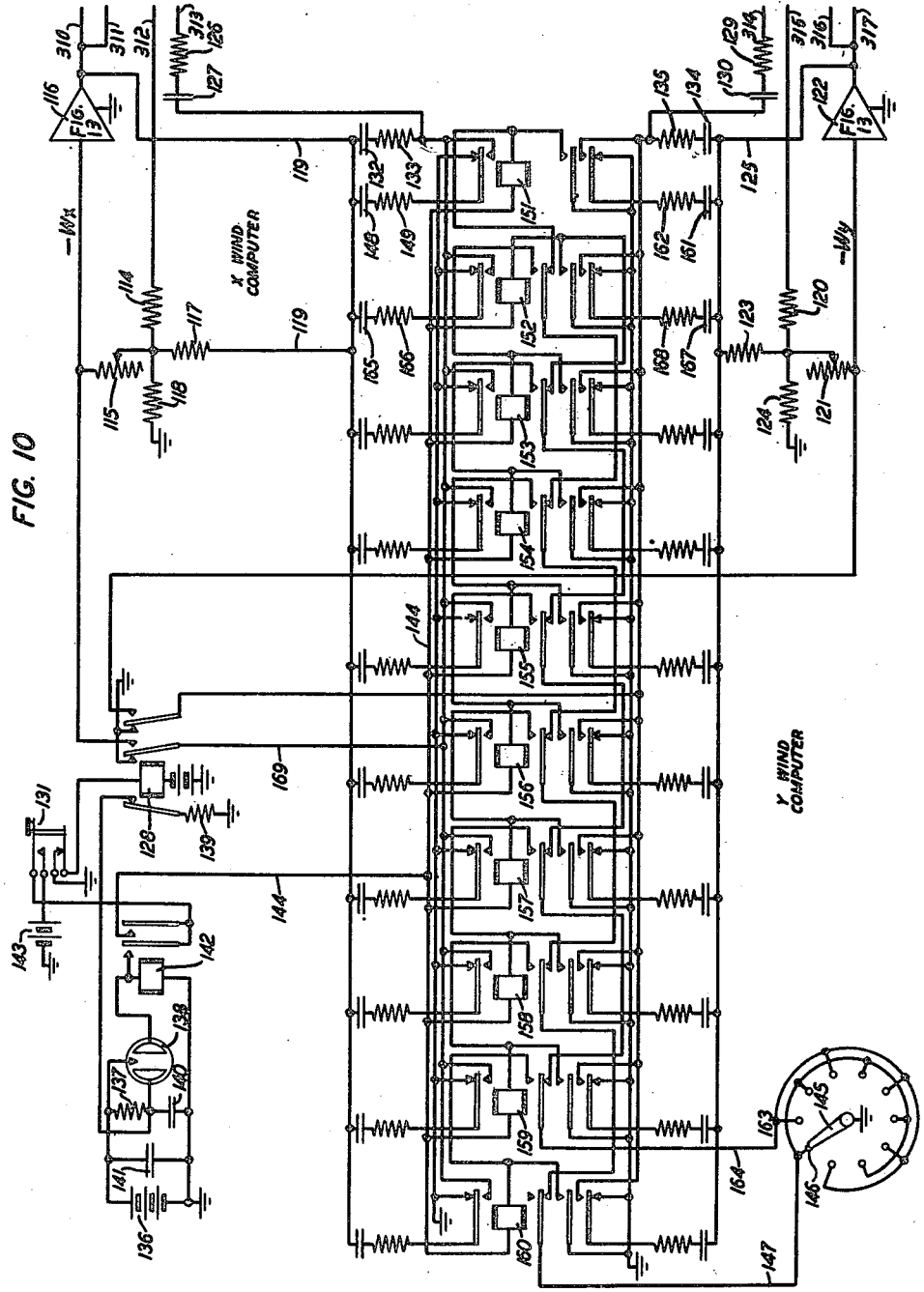

Fig. 3 diagrammatically shows the vector and component velocities involved in Fig. 1;

Fig. 4 shows the geometrical relationships of Fig. 1 at the instant of release of the bomb;

Fig. 5 shows the velocity relationships of Fig. 3 at the instant of release of the bomb;

Fig. 6 diagrammatically shows a radio locator associated with the computer;

Fig. 7 schematically shows a device for producing a rotation proportional to horizontal range;

Fig. 8 shows a summing amplifier forming part of the device shown in Fig. 7;

Fig. 9 schematically shows a device for producing a rotation proportional to the difference between angles $\theta$ and $\lambda$;

Figs. 10, 11 and 12 schematically show the computing elements forming part of the invention;

Fig. 13 schematically shows a summing amplifier forming part of Figs. 10, 11 and 12;

Figs. 14 and 14A schematically show the circuit for the steering meter; and

Fig. 15 schematically shows the circuit for releasing the bomb.

In Fig. 1, P represents an aerial vehicle, such as an airplane, headed along the course PA. Assume, as usual in bombing technique that the airplane is flying at constant speed and at constant height. If a wind be blowing with respect to the target, the airplane will actually travel along a track such as PB. The target is located at O, and the function of the present invention is to indicate the correct track PB, and the correct release point RP so that the bomb will fall on the target.

In Fig. 2, the constant height H of the airplane is PD, the constantly measured slant distance $\rho$ is PO. From these two measurements, the computer can continuously compute the distance DO, which is the horizontal range R, represented by PO in Fig. 1.

If PA is a correct bombing course, and the airplane steadily heads along the course PA at constant speed and height, releases a bomb at RP, and continues at the same speed along the track PB, it will reach the point B at the time of impact. The distance OB, along the fore and aft axis of the airplane is known as the "trail" T, and is tabulated in the ballistic tables for the type of bomb used.

The angle APO between the course of the airplane and the vertical plane through the target is designated $\theta$. If the air structure is standard, the bomb will fall directly behind the airplane, in the vertical plane including the head-to-tail axis of the airplane, that is, the trail is in the line of the course, so that angle BOC=angle APC=$\theta$. Thus, OC, the range component of the trail equals $T \cos \theta$ and BC, the deflection component of the trail equals $T \sin \theta$. The distance PC equals $R + T \cos \theta$.

The airplane is equipped with a gyroscopic device, such as the device shown in United States Patent 1,959,803, May 22, 1934, B. A. Wittkuhns, which maintains an axis PX having a direction fixed in space and is equipped with a servomotor which indicates the angle $\lambda$ between this axis and some fixed axis of the airplane which may conveniently be the head to tail axis of the airplane lying in the course of the airplane.

The azimuth angle $\theta$ is continuously measured by the observing equipment, thus, the angle $\delta$, between the axis fixed in direction and the vertical plane containing the airplane and the target, which is equal to $\theta - \lambda$ may be determined.

The relative velocity between the airplane and the target, which may be termed the "ground speed" is indicated by the vector V, Fig. 3. This vector V may be resolved into a component $-\dot{R}$ in the vertical plane containing the airplane and the target. This component is the rate of change in the horizontal range R, indicated by the dot, and as the range is decreasing is inherently a negative quantity. The vector V is also resolved into the component GF, equal to $R\dot{\delta}$, where $\dot{\delta}$ is the rate of change in $\delta$. (This resolution of vectors is shown in section 7, page 11, of The Dynamics of Particles, A. G. Webster, 1912, published by G. E. Stechert and Company, New York.)

In Figs. 1 and 3, the triangles BPC and FPG are similar, thus, $$\frac{R\dot{\delta}}{-\dot{R}} = \frac{T \sin \theta}{R + T \cos \theta}$$

This equation may be multiplied by $$\frac{\dot{R}(R + T \cos \theta)}{R}$$

and rearranged to give $$R\dot{\delta} + \frac{T}{R}(R\dot{\delta} \cos \theta + \dot{R} \sin \theta) = 0 \qquad (1)$$

If a voltage varying in proportion to the left-hand side of Equation 1 be produced and applied to a meter, the needle of the meter will be in the center of the scale when the airplane is on the correct track; when the airplane is to the right of the correct track the needle will be deflected to the left of the center of the scale; when the airplane is to the left of the correct track the needle will be deflected to the right of the center of the scale. The needle of the meter thus indicates in which direction the airplane should be turned to come back to the correct track.

Fig. 4 shows the relationship of Fig. 1 at the instant the airplane passes through the release point RP. The condition defining a correct release point is that if the plane continues after releasing the bomb along the same track at the same velocity for a time equal to the time of fall $t$ of the bomb it will just reach a point at a horizontal distance from the target, measured along the line of the course equal to the trail T.

In Fig. 4, as in Fig. 1, angle BCO is a right angle. Then, as before, the distance RPC equals $R + T \cos \theta$ The distance RPB is the distance the airplane travels at a velocity V during the time of fall $t$ of the bomb and evidently equals $Vt$. In Fig. 5 the velocity of the plane V is represented by the vector RPB, and the range component of this velocity $-\dot{R}$ is represented by the vector RPC. In Figs. 4 and 5 the triangles RPBC are similar. Thus $$\frac{-\dot{R}}{V} = \frac{R + T \cos \theta}{Vt}$$

and $$R + T \cos \theta + \dot{R}t = 0 \qquad (2)$$

The expression $R + T \cos \theta$ is termed the range component of the displacement of the vehicle from its predicted position at the instant of impact of the bomb, and the expression $\dot{R}t$ is the range component of the displacement of the vehicle during the predicted time of fall of the bomb. During the bombing run $R + T \cos \theta$ is larger than $\dot{R}t$, until, at the correct release point RP, these quantities become equal. Thus, if a voltage varying in proportion to the left-hand side of Equation 2 be produced, and supplied to a meter this voltage will fall to zero at the correct time to release the bomb.

The angle $\delta$ is measured with respect to an axis having a direction fixed in space, thus Equation 1 is valid for any course curved or straight. The voltage proportional to Equation 2 decreases as the airplane approaches the release point, and falls to zero at the release point. Thus, during the bombing run, the pilot may fly on any course at the measured height, and the steering meter will indicate the direction to be steered to come to the correct track, while the release meter indicates the time before reaching the correct release point. A convenient time before reaching the release point, the pilot steers to the correct track and follows this track when passing through the release point. After the bomb is released, the pilot may fly on any desired course.

In following a moving target, an observer will tend to overrun and underrun the target with his tracking device, thus introducing errors and irregularities in the data furnished to the computer. To make an accurate determination of $\dot{R}$ and $R\dot{\delta}$, the derived ratio must be averaged or smoothed. It is very difficult to smooth the measured values of a quantity such as $\dot{R}$ or $R\dot{\delta}$, the correct value of which is varying. Therefore, in accordance with the present invention, the observed positional data are operated upon so as to yield expressions for velocity components which are inherently constant, and these quantities are averaged. The observed positional data are operated upon to give the components, parallel and perpendicular to the fixed axis, of the vector velocity of the air with respect to the target. This vector velocity is constant during the bombing run and is therefore appropriate for averaging.

In Fig. 3 the vector S is the vector velocity of the airplane with respect to the air, measured along the course, or head-to-tail axis of the airplane, by known means, such as a Pitot tube device.

The vector −W represents the vector velocity of the air with respect to the target, which is the vector velocity of the wind with respect to the ground minus the vector velocity of the target with respect to the ground.

The vector V represents the vector velocity of the airplane with respect to the target.

These three vectors are not independent but satisfy the relation.

$$V = S - W$$

Taking the $x$ axis along PX, the axis fixed in space by the gyroscope, and the $y$ axis normal to PX, the vector S may be resolved into the components $$+S_x = +S \cos \lambda$$
$$S_y = -S \sin \lambda$$

in which $+S \cos \lambda$ is the component of the airspeed along the fixed axis, and $-S \sin \lambda$ is the component of the airspeed transverse to the fixed axis.

In deriving Equation 1, the vector V was resolved into a vector PG designated $-\dot{R}$, and a vector GF, designated $R\dot{\delta}$. In Fig. 3, GM and FN are normal to the fixed axis, and FL is normal to GM, thus FL equals MN. The angle PGM equals $$\frac{\pi}{2} - \delta$$

and as angle PGF is a right angle, angle FGM equals $\delta$. Thus, PM equals $-\dot{R} \cos \delta$ and MN equals FL which equals $R\dot{\delta} \sin \delta$, thus the component of V along the fixed axis, designated $V_x$, equals $-\dot{R} \cos \delta + R\dot{\delta} \sin \delta$.

$V_y$, the component of V transverse to the fixed axis, is FN, which evidently equals GM minus GL; thus $V_y$ equals $-\dot{R} \sin \delta - R\dot{\delta} \cos \delta$.

As $-W = -S + V$, the components of W may be written as $$-W_x = -S \cos \lambda - \dot{R} \cos \delta + R\dot{\delta} \sin \delta \quad (3)$$

$$-W_y = S \sin \lambda - \dot{R} \sin \delta - R\dot{\delta} \cos \delta \quad (4)$$

or, in the equivalent form, $$-W_x = -S \cos \lambda - \frac{d}{dt}(R \cos \delta) \quad (5)$$

$$-W_y = +S \sin \lambda - \frac{d}{dt}(R \sin \delta) \quad (6)$$

where $$\frac{d}{dt}(R \cos \delta)$$

is the ground speed along the $x$ axis, and $$\frac{d}{dt}(R \sin \delta)$$

is the ground speed transverse to the $x$ axis.

The values of $W_x$ and $W_y$ are averaged for the time of the bombing run, and in the averaging process the data are weighted in proportion to the accuracy of the measurements. Let the averaged values of these components be $$\overline{W_x} \text{ and } \overline{W_y}.$$

From Equations 3 and 4

$$\overline{\dot{R}} = -S \cos \theta + \overline{W_x} \cos \delta + \overline{W_y} \sin \delta \quad (7)$$

$$\overline{R\dot{\delta}} = S \sin \theta - \overline{W_x} \sin \delta + \overline{W_y} \cos \delta \quad (8)$$

where $\overline{\dot{R}}$ and $\overline{R\dot{\delta}}$ are subject to the low inaccuracies of the weighted time averages of $W_x$ and $W_y$, and may be used in the computation of the correct course and release point by Equations 1 and 2.

The present device requires voltages proportional to the slant distance from the airplane to the target, and to the azimuth angle from the reference vertical plane to the vertical plane through the airplane and the target. Many known devices may be adapted to supply these voltages. A potentiometer may be mounted on an optical range finder, and the wiper moved in accordance with the movements of the range indicator to select a voltage proportional to the slant distance measured by the range finder. Another potentiometer may be mounted concentrically with the vertical axis of a theodolite sighted on the target, and the wiper moved in accordance with the rotation of the theodolite to select a voltage proportional to the angle turned by the theodolite. Or, as shown in Fig. 6, a radio locator of any suitable type, such as shown in British Patent 535,120, March 28, 1941, Compagnie Generale de Telegraphie Sans Fil, may be adapted to supply these voltages. In this particular locator, the range is indicated by the location of a bright spot on the surface of a cathode ray oscilloscope 10. A worm shaft 11, rotated by a hand wheel 12, or by a suitable motor, drives a nut 13 carrying a pointer 14 which is kept aligned with the bright spot on the oscilloscope. The winding 19 of a potentiometer is mounted below the worm shaft 11, the wiper 15 of the potentiometer being mounted upon, but insulated from the nut 13. A suitable source of voltage may be connected to the terminals 16, 17, and the wiper 15 may be led out to a terminal 18. The antennas and reflectors 20, 21 of the radio transmitter and receiver may be supported by a framework mounted on a shaft 22 journalled in a support 23 rotatably mounted in a base 24. The hand wheel 25, bevel gears 26 and gear 27 drive the gear 28 rotating the antennas in azimuth. A potentiometer winding 29 may be mounted upon the base 24 but insulated therefrom, and connected to the terminals 30, 31. A wiper 33 may be mounted upon the support 23 but insulated therefrom and connected to a terminal 32. The voltage selected by the wiper 33 will then be proportional to the azimuth angle. While, for the sake of explanation, one specific type of locator has been illustrated it is evident that the present invention is not limited to use with such a device, but will operated with many optical, mechanical, radio, sonic and other devices.

In Fig. 7 voltage from a suitable source 35 is applied to the terminals 16, 17 of the winding 19 associated with the range indicator in Fig. 6. Voltage from the source 36 is applied to the windings 37 and 38 of two other potentiometers. The windings 19, 37, 38 have a resistance per unit length varying linearly with the wiper displacement, so that the voltages selected by the wipers 15, 39, 40 are proportional to the square of the distance moved by the wipers.

The voltage selected by the wiper 15 is, as indicated, of the opposite polarity to the voltages selected by the wipers 39, 40.

The wiper 39 is set at the measured value of the height of the airplane.

The voltages selected by the wipers 39, 40 which are respectively equal to $+H^2$, the square of the height or altitude of the airplane, and approximately equal to $+R^2$, the square of the horizontal range, and the voltage from the wiper 15 which, due to the reversal of polarity, is proportional to $-\rho^2$, the negative square of the slant distance, are respectively supplied to a summing amplifier 41, which may be of the type shown in Fig. 8.

It will be noted from Fig. 2 that H and R are the sides of a right triangle, of which $\rho$ is the hypotenuse, thus $H^2+R^2-\rho^2$ should equal zero.

If the voltages summed up by the amplifier 41 are not equal to zero, the relay 42 will be operated. The relay 42 is a polar relay, normally biased to a central position, and moved in one direction or the other depending upon the polarity of the applied voltage.

The relay 42 controls the supply and phase of alternating current from the source 43 to one phase of the two-phase motor 46, the other phase of the motor 46 being supplied from the source 43 through the 90-degree phase-shifting network 44. When the relay 42 is operated the motor 46 is started, rotating in a direction related to the polarity of the voltage applied to relay 42. The wiper 40 is moved by the shaft of the motor 46, either directly or through suitable gearing, flexible shafting or other mechanical expedient. The movement of the wiper 40 changes the voltage selected by the wiper 40 until the voltage in the output of amplifier 41 is reduced to zero and relay 42 is released. Under this condition $$H^2+R^2-\rho^2=0$$

and the movement of the wiper 40 indicates the value of R, the horizontal range. Other potentiometers may be mounted so that their wipers will also be rotated by the motor 46 an amount proportional to R.

The summing amplifier 41 of Fig. 7, which is shown in Fig. 8 may include any desired number of stages of amplification. Any suitable vacuum tubes may be used, though pentode tubes, or other tubes of high gain, will generally be found most efficient. The heaters are supplied with power in known manner (not shown).

The resistors 47, 48, 49 are connected to the control electrode of the vacuum tube 50, the terminal 51 being grounded. The first stage vacuum tube 50 may conveniently be a single cathode double triode, though two separate tubes of any suitable type may be used. The cathode of the vacuum tube 50 is connected to a resistor 52 of fairly high resistance, say of the order of one or two hundred thousand ohms. The anode current flowing in the resistor 52 would tend to make the cathode of the vacuum tube 50 positive with respect to ground. A source of voltage 53, having the negative pole connected to the resistor 52, and the positive pole connected to ground on terminal 51, compensates for the voltage drop in resistor 52, so that the cathode of the vacuum tube 50 is at substantially ground potential. Since the total space current leaving the cathode is very nearly equal to the quotient of the voltage of 53 and the resistance of 52, their relative values must be chosen so as to give reasonable current values in the triodes used.

The double triode 50 is connected so as to reduce drift due to variations in cathode activity as described in an article "Sensitive D. C. amplifier with A. C. operation" by S. E. Miller, published in Electronics, November 1941, page 27.

The upper section of the twin triode 50 is coupled to the vacuum tube 54 by an interstate coupling network of the type shown in United States Patent 1,751,527, March 25, 1930, H. Nyquist, including the resistors 56, 57, 58 and a source of voltage 55 having the positive pole connected to resistor 56, the negative pole connected to resistor 58 and an intermediate point connected to ground. The resistor 56 may be adjustable to assist in making the potential of the cathode of vacuum tube 50 equal to ground potential.

The vacuum tube 54 is coupled by a similar interstage coupling network to the vacuum tube 60.

Current from a source 61 is supplied through resistor 62 to the anode of vacuum tube 60, returning through the cathode to the source 61.

The wipers 15, 39, 40, Fig. 7, are respectively connected to resistors 47, 48, 49 and the winding of relay 42 is connected to terminals 63, 64.

The source 61 tends to maintain the terminal 63 at a potential positive with respect to ground. This potential is opposed by a potential from the source 65 through the winding of relay 42 so that, in the absence of an applied signal, the terminals 63, 64 are at the same potential, that is, there is no potential difference applied to the winding of the relay 42, Fig. 7. Assume that a voltage is applied to one of the resistors 47, 48 or 49, of such polarity that the amplified voltage causes the control grid of the vacuum tube 60 to become more negative. This voltage will reduce the anode-cathode current of the vacuum tube 60, reduce the voltage drop across the resistor 62, increase the positive potential of the terminal 63 with respect to ground and cause a current to flow from the terminal 63 to the terminal 64 through the winding of the relay 42, Fig. 7, operating the relay 42 in one direction. If the applied voltage is of such polarity that the amplified voltage causes the control grid of the vacuum tube 60 to become less negative, the anode-cathode current of the vacuum tube 60 will increase, increasing the voltage drop across the resistor 62, reducing the positive potential of the terminal 63 with respect to ground and causing a current to flow from the terminal 64 to the terminal 63 through the winding of the relay 42, Fig. 7, operating the relay 42 in the other direction.

A portion of the output of the vacuum tube 54 flows through the voltage dividing resistors 66, 67. A portion of the voltage drop across the resistor 67 is applied by the wire 68 to the control grid of the lower portion of the twin triode 50. A source of voltage 69 has the positive terminal connected to the anode of this portion of the twin triode 50 causing a current to flow from anode to cathode, thence through resistor 52 and source 53 back to source 69. This current flowing in the resistor 52 tends to make the cathode of vacuum tube 50 positive with respect to ground which is equivalent to a negative voltage on the control grid of the upper portion of the twin triode 50. This added voltage is included in the compensation by the source 53 so that normally the control grid of the upper section and the cathode of the twin triode 50 are at ground potential when the two anode currents have reasonable values.

The voltage from the resistor 67 is effectively a negative feedback to the control grid of the upper portion of the twin triode 50. Assume a voltage is applied through one of the resistors 47, 48 or 49 to make the control grid of the upper section of the twin triode more negative. The anode-cathode current of this section will decrease, decreasing the voltage drop in resistor 56, making the control grid of vacuum tube 54 more positive or less negative. The anode-cathode current of vacuum tube 54 will increase, increasing the voltage drop in resistor 70 making the control grid of vacuum tube 60 and the control grid of the lower section of the twin triode 50 less positive or more negative. The anode-cathode current of the lower section of the twin triode 50 will decrease, decreasing the voltage drop in the resistor 52, decreasing the positive potential of the cathode, which is equivalent to decreasing the negative potential of the control grid of the upper section of the twin triode 50. Then when the applied signal made the control grid more negative, the feedback tended to make the control grid less negative and is thus a negative feedback.

It has been shown in United States Patent 2,251,973, August 12, 1941, E. S. L. Beale et al., for example, that the voltage across a capacitor may be proportional to the time derivative or rate of change of the applied voltage. The capacitor 71 differentiates the applied voltage and feeds back a voltage proportional to the time derivative of the applied voltage which assists in preventing hunting and oscillation of the motor 46, Fig. 7.

The source of voltage 72 supplies voltage through resistor 73 to the potentiometer 74 to adjust the bias voltages applied to the control grids of the vacuum tubes 60 and 50.

Fig. 9 shows a device similar to the device shown in Fig. 7 to produce a rotation of a shaft proportional to the angle $\delta$, Fig. 1. A voltage source 75 is connected across the windings of the potentiometers 76, 77. A voltage source 78 is connected across the winding of the potentiometer 29, which is also shown in Fig. 6. The windings of the potentiometers 76, 77, 29 have a linear variation of resistance with movement of the wipers. The wiper 79 of potentiometer 76 is moved by the servomotor of the gyroscope 84 maintaining the fixed axis shown in Fig. 1 through the angle $\lambda$ and selects a voltage proportional to $+\lambda$. The wiper 33 of the potentiometer 29 is moved by the antenna support 23, Fig. 6, through an angle $\theta$ and due to the reversed polarity of source 78, selects a voltage proportional to $-\theta$. The potentiometer used in this device may be the potentiometer 29 shown in Fig. 6, or, a second potentiometer similarly associated with the antenna support, 23. The voltage selected by the wiper 80 is approximately proportional to $(\theta-\lambda)$. The voltages selected by the wipers of the potentiometers are supplied to individual input resistors of a summing amplifier 81, which may be of the type shown in Fig. 8. The voltage in the output of the amplifier 81 will be proportional to $+\lambda-\theta+(\theta-\lambda)$ which should equal zero. If this voltage is not equal to zero, the relay 83 will be operated, starting the motor 82, which moves the wiper 80 of potentimeter 77 to make the voltage from amplifier 81 equal to zero, releasing relay 83 and stopping the motor. The shaft of the motor 82 will then have moved through an angle $\theta-\lambda$, which is equal to the angle $\delta$, Fig. 1.

Thus, from the antenna support 23 of Fig. 6, there is a movement proportional to the angle $\theta$, Fig. 1; from the servomotor of the gyroscope 84 maintaining the fixed axis there is a movement proportional to the angle $\lambda$, Fig. 1; from the shaft of the motor 82, Fig. 9, there is a movement proportional to $\theta-\lambda$, that is, the angle $\delta$, Fig. 1; and from the shaft of the motor 46, Fig. 7, there is a movement proportional to the horizontal range R, Fig. 2. It is obvious that more than one potentiometer winding may be associated with each of these devices, so that the wipers will be moved proportionately to the particular movement. Also, the servomotors may be geared, or otherwise connected, to the shafts, so that the motor may make more than one revolution for one revolution of the wipers.

In Fig. 11, a source of voltage 91 has its positive pole connected to one end of the winding 92 and its negative grounded pole connected to the other end of the winding 92. Another source of voltage 93 has its negative pole connected to one end of the winding 94 and its grounded positive pole connected to the other end of winding 94. The windings 92, 94 are preferably segments of the same circle, and have a variation of resistance such as to give a linear variation in voltage. The wipers 95, 96 are moved by the shaft of the motor 46, Fig. 7, but are insulated therefrom and from each other, to select voltages, respectively positive and negative, proportional to the horizontal range, R.

The voltages selected by the wipers 95, 96 are respectively applied to two diametrically opposite points 98, 99 of the potentiometer winding 97. The equidistant, intermediate, diametrically opposite points 100, 101 of the potentiometer winding 97 are connected to ground. The winding 97 has a resistance varying with length such that the voltage of the winding with respect to ground varies with a sinusoidal function. Assuming zero angle at the point 100 and that the wiper starts at point 100 and rotates clockwise, the voltage of the wiper with respect to ground will be zero at point 100, positive maximum at points 98, zero at point 101, negative maximum at point 99, and zero at point 100 and this is the variation of a positive sine. If the direction of the wiper be turned through 180 degrees, the sign of the sine will be reversed. Thus, the wiper 102, which is turned through 180 degrees will select a voltage varying with the negative sine of the angle of rotation, and the wiper 103, which leads the wiper 102 by 90 degrees will select a voltage varying with the negative cosine of the angle of rotation. The wipers 102, 103 are rotated by the shaft of the motor 82, Fig. 9, through the angle $\delta$, Fig. 1, and are insulated from the shaft and from each other. As the voltage applied to the winding 97 varies with R, the voltage selected by the wiper 102 varies with $-R \sin \delta$, and the voltage selected by the wiper 103 varies with $-R \cos \delta$.

Current from the source 91 can flow through the upper half of the potentiometer winding 104 to ground, thence back to source 91. Current can also flow from source 93 through ground to the lower half of potentiometer winding 104, thence through connection 105 to source 93. The wipers 106, 107 are simultaneously moved or manually adjusted in opposite directions to select equal positive and negative voltages with respect to ground proportional to the velocity of the vehicle with respect to the air, that is, the air speed S.

The positive voltage from the wiper 106 and the negative voltage from the wiper 107 are applied to diametrically opposite points of a potentiometer winding 108, the equidistant intermediate points being grounded. The potentiometer winding 108 has a resistance varying with the length of the winding such that the voltage with respect to ground varies with a sinusoidal function, and thus has the same variation of voltage with respect to ground as the winding 97. The wipers 110, 111 are moved by the shaft of the servomotor of the gyroscope maintaining the fixed axis through an angle proportional to λ, the wipers 110, 111 being insulated from the shaft and from each other. With zero angle at the point 109 and clockwise rotation the wiper 110 will select a voltage proportional to the negative cosine, and the wiper 111 to the positive sine of the angle of rotation. As the applied voltage is proportional to S, the voltage selected by the wiper 110 is proportional to −S cos λ and the voltage selected by the wiper 111 is proportional to +S sin λ.

The resistors 112, 113 limit the currents drawn from the potentiometer winding 104, and thus make easier the design of the potentiometer winding.

In the measurement of the slant range and azimuth angle of the target, some errors are involved. The measuring process is not perfectly accurate, producing random errors in range which are roughly constant but tend to decrease slightly with decreasing range; and random errors in azimuth angle which are in the form of angular errors, but are equivalent to a linear error which also decreases roughly with the reciprocal of the decreasing range. The observers will tend to overrun and underrun the target in tracking, producing a more or less regular error, depending on the skill of the observer, and tending to decrease with decreasing range. As the measurements are expressed in the form of electrical voltages, which are conveniently selected by means of wire-wound potentiometers, there will also be a step-like error due to the sudden variation in voltage from one turn of wire to the next. These small errors in the positional measurements can produce large momentary errors in the derived ratio R and Rδ which must be averaged out. It is difficult to average or smooth an inherently variable quantity, such as R or Rδ, to produce the most probable value without reducing the accuracy of the measurement. In accordance with the present invention, these inherently variable quantities are combined to give quantities which, under the assumptions usually made in bombing, should be constant. In particular, it is assumed that for some time before releasing the bomb, and during the fall of the bomb, the wind and target velocities remain constant in direction and magnitude. Thus, it is convenient and consistent to express R and Rδ in terms of the assumed constant velocity of the air with respect to the target. R and Rδ are resolved into components along the X and Y axes. By subtracting the airplane's airspeed components S cos λ and S sin λ, in effect the air velocity is determined with respect to a point fixed to the target.

The observation of the target may start when the distance is too long for reliable results. Thus, some time after the target has come under observation, the operator presses a key and the observed data are sent to the computer. Observed data are treated as above to given the components of the velocity of the air with respect to the target, and these values are electrically smoothed or averaged. As the earlier observations are not as accurate as the later observations, the averaging process is weighted approximately in accordance with an inverse range function. This result is attained by switching in added averaging elements at regular intervals as the range decreases, so that the later observations will have materially more effect on the final result than the earlier observations.

The voltage selected by the wiper 103 proportional to −R cos δ, and the voltage selected by the wiper 110, proportional to −S cos λ are supplied to the x wind computer, Fig. 10; the voltage selected by the wiper 102 proportional to −R sin δ and the voltage selected by the wiper 111 proportional to +S sin λ are supplied to the y wind computer, Fig. 10.

In Fig. 10 the voltage proportional to −S cos λ is applied through connection 312, resistor 114, and variable resistor 115, to the amplifier 116, which may be of the type shown in Fig. 13. The resistors 117, 118 are connected by connection 119 in serial relationship across the output of the amplifier 116, and negative feedback is supplied from the junction of resistors 117, 118 through resistor 115 to the input of amplifier 116.

The voltage proportional to +S sin λ is similarly applied through connection 315, resistor 120, and variable resistor 121, to the amplifier 122, which may also be of the type shown in Fig. 13. The resistors 123, 124 are connected by connection 125, in serial relationship across the output of the amplifier 122, and negative feedback is supplied from the junction of resistors 123, 124 through resistor 121 to the input of amplifier 122.

The voltage proportional to −R cos δ is connected through connection 313, resistor 126, capacitor 127 and connection 169 to the center armature of relay 128. Similarly, the voltage proportional to −R sin δ is connected through connection 314, resistor 129 and capacitor 130 to the right hand armature of relay 128. At the start of the bombing run, relay 128 is held operated, grounding both of these armatures.

After the bombing run has started and the observations have settled down, the key 131 is operated, releasing the relay 128. When relai 128 is released, the voltage proportional to −R cos δ is supplied through resistor 126 and capacitor 127 to the input of amplifier 116; and the voltage proportional to −R sin δ is supplied through resistor 129 and capacitor 130 to the input of amplifier 122. As shown in United States Patent 2,251,973, August 12, 1941, E. S. L. Beale et al., when a voltage is supplied through a capacitor to the input of an amplifier, the output of the amplifier will contain a component proportional to the time derivative, or rate of change, of the applied voltage. Thus, the output of the amplifier 116 will have a component proportional to $$\frac{d}{dt}(-R\cos\delta)$$

and the output of the amplifier 122 will have a component proportional to $$\frac{d}{dt}(-R\sin\delta)$$

A large value of reverse feedback is supplied by the connections 119 and 125, thus reducing the apparent input impedances to ground of the amplifiers 116 and 122 to a very low value, increasing the accuracy of the differentiating and the summing actions.

The amplifier 116 adds the applied voltages proportional to $-S\cos\lambda$ and $$\frac{d}{dt}(-R\cos\delta)$$

and reverses the polarity to produce a voltage proportional to $+W_x$. Similarly the amplifier 122 adds the applied voltages proportional to $$+S\cos\lambda+\frac{d}{dt}(-R\cos\delta)$$

and reverses the polarity to produce a voltage proportional to $+W_y$.

The resistors 126, 129 smooth the applied voltages. The time constants of the resistor 126 and capacitor 127, and of the resistor 129 and capacitor 130 should be fairly small.

The release of relay 128 also connects capacitor 132 and resistor 133 in serial relationship from the output to the input of the amplifier 116; and connects the capacitor 134 and resistor 135 in serial relationship from the output to the input of the amplifier 122. The feedbacks through capacitors 132 and 134, integrate or average the applied voltages, though, as capacitors 132 and 134 are comparatively small, this averaging is small.

Positive voltage is applied from the source 136, through resistor 137 to a control electrode of the three element cold cathode device 138, which may be a Western Electric Type 313C vacuum tube. As long as the relay 128 is operated, the control electrode is grounded through resistor 139, and the applied voltage is too small to break down the tube. When the relay 128 is released, the voltage from the source 136, through resistor 137, increases the charge on capacitor 140, until the voltage applied to the control electrode breaks down the tube, permitting current from the source 136, and the capacitor 141 to flow through the tube 138 and the winding of relay 142, operating relay 142. The resistance of resistor 137, and the capacitance of capacitor 140 are so related to the breakdown voltage of tube 138 that a delay of some ten seconds is produced between the release of relay 128 and the operation of relay 142.

The operation of key 131 and relay 142 completes a locking circuit for relay 142 from the source 143 through the upper springs of key 131, left make springs and winding of relay 142 and ground back to source 143; and connects the source 143 through the upper springs of key 131 and the right make springs of relay 142 to connection 144.

The grounded wiper 145 is rotated by the shaft of the motor 46, Fig. 7, proportionately to the horizontal range to the target. At some convenient range, the wiper 145 grounds the contact 146.

When contact 146 is grounded, current can flow from battery 143, through key 131, springs of relay 142, connection 144, winding of relay 151, break contacts of second spring pile-ups of relays 152, 154, 156, 158, 160 and connection 147 to contact 146, operating relay 151, which locks up through the middle grounded make contact.

The operation of relay 151 connects capacitor 148 and resistor 149 in parallel relationship with capacitor 132 and resistor 133, increasing the loading function of amplifier 116; and connects capacitor 161 and resistor 162 in parallel relationship with capacitor 134 and resistor 135, increasing the loading function of amplifier 122.

As the range continues to decrease, the wiper 145 is rotated until contact 163 is grounded.

When contact 163 is grounded, current can flow from battery 143, through key 131, springs of relay 142, connection 144, winding of relay 152, break contacts of second spring pile-ups of relays 153, 155, 157, 159 and connection 164 to contact 163, operating relay 152, which, at the second spring pile-up transfers the chain connection from the winding of relay 151 to the winding of relay 153 and locks up through the grounded make contact of the third pile-up.

The operation of relay 152, at the upper spring pile-up, connects capacitor 165 and resistor 166 in parallel relationship with capacitor 132 and resistor 133; and, at the lower spring pile-up connects capacitor 167 and resistor 168 in parallel relationship with capacitor 134 and resistor 135.

The continued rotation of wiper 145 causes the operation of the remaining chain relays 153 to 160, in succession, until the bomb has been released, or minimum range is reached.

The successive operations of the chain relays 153 to 160 connect a succession of capacitors and resistors in parallel relationship with capacitor 132 and resistor 133, and in parallel relationship with capacitor 134 and resistor 135, thus progressively changing the averaging properties of amplifiers 116 and 122. The resistors may conveniently be of about 10,000 ohms, capacitors 132, 134 about .1 microfarad each, capacitors 148, 161 about .25 microfarad each and the remaining capacitors, such as 165, 167, about .35 microfarad each.

When the bombing run is completed, the release of key 131 unlocks relay 142 and all the chain relays 151 to 160 which may be locked up, and operates relay 128, restoring the circuit to its initial condition in preparation for the next bombing run.

The quantity $W_x$ (and the quantity $W_y$) is a velocity; thus, the weighted average of this velocity is, by definition:

$$\overline{W_x}=\frac{\int_{t_0}^{t}W_xFdt}{\int_{t_0}^{t}Fdt} \qquad (9)$$

in which $t_0$ is the time at which the averaging process starts, and $F$ is the weighting function.

By evaluating the time rate of change $$\dot{\overline{W_x}} \text{ of } \overline{W_x}$$

from the above equation, the equation may be manipulated into the differential form:

$$W_x-\overline{W_x}-K\dot{\overline{W_x}}=0 \qquad (10)$$

in which $K$ usually varies with time, and, $$K=\frac{1}{F}\int_{t_0}^{t}Fdt$$

As $$W_x=+S\cos\lambda+\frac{d}{dt}(R\cos\delta)$$

then $$\frac{d}{dt}(R\cos\delta)+S\cos\lambda-\overline{W_x}-K\dot{\overline{W_x}}=0 \qquad (11)$$

Let $C_1$ be the capacitance of capacitor 127, $C_2$ be the capacitance of the capacitors, such as capacitor 132, in the feedback path, $R_1$ be the resistance of resistor 117, the voltage gain of amplifier 116, $\mu$, be large and substantially independent of frequency, the output load of amplifier 116 be a substantially constant resistance, and the internal output impedance of amplifier 116 be small compared with the resistance $R_1$ in parallel relationship with $C^2$. Under these conditions, the total impedance $Z_t$ from the output terminal of amplifier 116 to ground is approximately represented by a capacitance $C_t$ in parallel relationship with a resistance $R_t$.

The constants of the circuit of Fig. 11 are adjusted to produce scale factors such that the voltage selected by the wiper 103 is $-K_1 R \cos \delta$, and the voltage selected by the wiper 110 is $-R_1 C_1 K_1 S \cos \lambda$, where $K_1$ is a constant.

Including these limitations, the output of amplifier 116, equal to $K_2 W_x$, obeys the following equation:

$$\frac{d}{dt}(K_1 R \cos \delta) + R_1 C_1 K_1 S \cos \lambda - \frac{K_2}{R_1 C_1 K_1}\left(1+\frac{R_1}{\mu R_t}\right)\overline{W}_x - \frac{C_2 K_2}{C_1 K_1}\left(1+\frac{C_t}{\mu C_2}\right)\dot{\overline{W}}_x = 0 \quad (12)$$

which is equivalent to Equation 11 if $$\frac{K_2}{R_1 C_1 K_1}\left(1+\frac{R_1}{\mu R_t}\right)=1$$

and $$\frac{C_2 K_2}{C_1 K_1}\left(1+\frac{C_t}{\mu C_2}\right)=K$$

The capacitors, such as capacitor 148, are connected to the output circuit of amplifier 116, so that they will be charged up to the output voltage, and are switched, at the low potential side, from ground to the input of amplifier 116, so as to avoid causing spurious discontinuities in the value of $W_x$.

With $C_2$ increased by discrete steps, the weight function increases exponentially with time between charges, with exponent inversely proportional to the value of $C_2$ and abruptly decreases when a new value of capacity is switched in. These abrupt changes are smoothed out, by the series resistors, such as resistors 126, 129.

The complete circuit produces a result that closely approximates to a weight function which is zero before time $t_0$ and increases thereafter with the reciprocal of the horizontal range.

The amplifiers 116 and 122 reverse the polarities of the applied voltages. Thus, as the input to the amplifier 116 is proportional to $-W_x$, the output of amplifier 116 is proportional to $+\overline{W}_x$; and the output of amplifier 122 is proportional to $+\overline{W}_y$.

The output voltage of amplifier 116 is supplied by connection 310 to the point 170 of the potentiometer winding 171, Fig. 11. A portion of the output of amplifier 116 is supplied, through connection 311 and resistor 172, to a summing amplifier 173, which may be of the type shown in Fig. 13, having a feedback resistor 174. The amplifier 173 reverses the polarity of the applied voltage. The output of the amplifier 173, which is proportional to $-\overline{W}_x$ is supplied to the point 175 of the potentiometer winding 171.

The potentiometer winding 171, like the windings 97 and 108, has a resistance varying with the length of the winding such that the voltage with respect to ground varies with a sinusoidal function. With zero angle at the point 176, and clockwise rotation, the wiper 177 selects a voltage proportional to a negative sine, and the wiper 178 selects a voltage proportional to a positive cosine. The wipers 177, 178 are moved by the shaft of motor 82, Fig. 9, an angle equal to angle $\delta$, Fig. 1, the wipers 177, 178 being insulated from the shaft and each other. The voltage selected by the wiper 177 is thus proportional to $-W_x \sin \delta$ and the voltage selected by the wiper 178 is proportional to $+W_x \cos \delta$.

The output voltage of the amplifier 122, Fig. 10, proportional to $+\overline{W}_y$ is supplied by connection 316 to the point 180 of the potentiometer winding 181, which has a variation in resistance similar to the variation in resistance of the winding 171.

The output voltage of the amplifier 122, Fig. 10, is supplied by connection 317 to the input resistor of amplifier 182, and the polarity of this voltage is reversed in the amplifier 182, which is similar to amplifier 173 and supplied to the point 183 of the winding 181.

With zero angle at the point 184 and clockwise rotation for increasing angles, the wipers 185 and 186 respectively select voltages proportional to a positive sine and a positive cosine. The wiper 185 is therefore displaced 180 degrees with respect to wiper 177. The wipers 185, 186, like the wipers 177, 178, are moved by the shaft of motor 82, Fig. 9, an amount proportional to angle $\delta$, Fig. 1, and are insulated from the shaft and from each other. The voltage selected by the wiper 185 is thus proportional to $+\overline{W}_y \sin \delta$ and the voltage selected by the wiper 186 is proportional to $+\overline{W}_y \cos \delta$.

The voltages selected by the wipers 106, 107, respectively proportional to $+S$ and $-S$ are supplied, through resistors 112, 113, to points 187, 188 of potentiometer winding 189. The winding 189, like windings 97, 108, 171 and 181, has a resistance varying so as to produce a voltage varying with a sinusoidal function. The wipers 190, 191 are moved by the support 23, Fig. 6, an amount proportional to the angle $\theta$, Fig. 1. With zero angle at point 192 and clockwise rotation for increasing angle, the wipers 190, 191 respectively select voltages proportional to $+S \sin \theta$ and $-S \sin \theta$.

The voltage selected by the wiper 177, proportional to $-\overline{W}_x \sin \delta$; the voltage selected by the wiper 190 proportional to $+S \sin \theta$; and the voltage selected by the wiper 186 proportional to $$+\overline{W}_y \cos \delta$$

are respectively supplied, through resistors 193, 194, 195 to the input of a summing amplifier 196 which may be of the type shown in Fig. 13, having a feedback resistor 197. The summing amplifier 196 sums up the voltages $$+S \sin \theta - \overline{W}_x \sin \delta + \overline{W}_y \cos \delta$$

which, from Equation 8 are equal to $\overline{R\delta}$. As the amplifier 196 also reverses the polarity of the applied voltages, the potential of the connection 198 with respect to ground is proportional to $-\overline{R\delta}$.

The voltage selected by the wiper 178, proportional to $+\overline{W}_x \cos \delta$; the voltage selected by the wiper 191, proportional to $-S \cos \theta$; and the voltage selected by the wiper 185 proportional to $+\overline{W}_y \sin \delta$ are respectively supplied through resistors 199, 200, 201 to a summing amplifier 202, similar to amplifier 196 and having a feedback resistor 203. The amplifier 202 sums up the voltages $-S \cos \theta + \overline{W}_x \cos \delta + \overline{W}_y \sin \delta$, which, from Equation 7, equal $\overline{R}$. Thus, as the amplifier 202 reverses the polarity of the applied voltages, the potential of the connection 204, with respect to ground, is proportional to $-\overline{R}$.

The connections 198 and 204, Fig. 12, correspond to the similarly numbered connections of Fig. 11.

From Fig. 1 it is evident that, as the vehicle is flying toward the target, the angle $\theta$ cannot exceed plus or minus 90 degrees, because, if the angle $\theta$ exceeds 90 degrees the vehicle would be flying away from the target.

The angle $\theta$ is thus always in the first quadrant, where the sine and cosine are of the same sign or in the fourth quadrant where the cosine is unchanged, but the sine changes sign. In a potentiometer having only one wiper arm, the winding may be spread over the whole circle, the wiper arm being moved through $2\theta$. For a cosine function, the voltages applied to the two halves of the winding are of the same polarity. For a sine function, the voltages applied to the two halves of the winding are of opposite polarity. In a potentiometer having two wiper arms, the winding may extend over the whole circumference, or may be limited to three quadrants extending over the circumference, the arms being geared to rotate through $3/2\,\theta$.

The potentiometer winding 205 has a resistance varying with a cosinusoidal function in the first and fourth quadrants, the zero angle or axis of the vehicle being at the point 206. The wiper 207 is driven by the support 23, Fig. 6, at twice the rotational speed of the support 23, say by means of suitable gearing. The voltage of the connection 198 is applied at the point 206. The voltage selected by the wiper 207 will be proportional to $-\overline{B\delta}\cos\theta$.

The potentiometer winding 208 has a resistance varying with a sinusoidal function in the first and fourth quadrants, the zero angle being at the ground. The voltage of the connection 204 is applied directly to the upper part of the winding 208. The voltage of the connection 204 is applied through a resistor 209 to an amplifier 210, which may be of the type shown in Fig. 13, having a feedback resistor 211. The amplifier 210 reverses the polarity of the voltage of the connection 204, and supplies voltage of reversed polarity to the lower half of the winding 208. The wiper 212, like the wiper 207, is moved through twice the angle of the support 23, though both wipers are insulated from the drive and each other. The wiper 212 will select a voltage proportional to $-\overline{R}\sin\theta$.

The voltages selected by the wipers 207 and 212 are respectively supplied through resistors 213, 214 to an amplifier 215 of the type shown in Fig. 14 which adds these voltages and reverses the polarity. The output voltage of amplifier 215 tends to be proportional to $\overline{R\delta}\cos\theta+\overline{R}\sin\theta$, which is the component of the ground speed V transverse to the course of the airplane.

The output voltage of the amplifier 215 is supplied to the winding of a potentiometer 216 having a uniform variation of resistance. The wiper 217 is moved by the motor 46, Fig. 7, but is insulated therefrom to select a voltage with respect to ground proportional to the horizontal range R and this voltage is applied through the feedback resistor 218 to the input of the amplifier 215.

For simplicity, consider the condition when a single voltage, $E_1$ is applied, say through the resistor 213 to the amplifier 215. Let the resistor 213 have a resistance $R_1$. Then the input current $$I_1=\frac{E_1-E_0}{R_1}$$

where $E_0$=voltage at amplifier input. A voltage $E_2$ will appear in the output circuit and this voltage is applied across the winding 216. The wiper 217 selects a voltage $RE_2$. Let the resistor 218 have a resistance $R_2$. Then the current $I_2$ in the resistor 218 equals $$\frac{RE_2-E_0}{R_2}$$

The effect of high negative feedback is to keep $E_0=0$. Hence, since $$I_1=-I_2,\ \frac{E_1}{R_1}=-\frac{RE_2}{R_2},\ \text{and}\ -E_2=\frac{E_1}{R}\times\frac{R_2}{R_1}$$

Let $R_1=R_2$, then $$-E_2=\frac{E_1}{R}$$

The output voltage of the amplifier 215 is thus $1/R$ of the sum of the input voltages. If the resistors $R_1$ and $R_2$ are not equal, the output voltage is changed in the ratio of $R_2$ to $R_1$. The output voltage is also reversed in polarity.

The output voltage of the amplifier 215, proportional to $$+\frac{1}{R}(\overline{R}\sin\theta+\overline{R\delta}\cos\theta)$$

is applied to a potentiometer winding 219. The wiper 220 is adjusted to select a voltage proportional to the value of the trail T for the particular speed and altitude of the vehicle. The wiper 220 will thus select a voltage proportional to $$\frac{T}{R}(\overline{R}\sin\theta+\overline{R\delta}\cos\theta)$$

This voltage is supplied to the steering circuit 221, together with a voltage from the connection 198 equal to $-\overline{R\delta}$.

The steering circuit 221, and the amplifier 215, shown in Fig. 12, produce a current proportional to the difference of the input voltages $$\frac{T}{R}(\overline{R}\sin\theta+\overline{R\delta}\cos\theta)-(-\overline{R\delta})$$

which may be written $$\overline{R\delta}+\frac{T}{R}(\overline{R\delta}\cos\theta+\overline{R}\sin\theta)$$

as in Equation 1. The output current of the steering circuit 221 actuates the meter 222. When the vehicle is on the correct course, the meter 222 reads in the center of the scale. When the vehicle is off the correct course, the meter 222, which has a center zero, indicates the direction and magnitude of the amount off course. Thus, as the vehicle approaches the release point the pilot steers the vehicle to keep the meter 222 reading zero.

Voltage from the connection 204, Fig. 12, proportional to $-\overline{R}$, is applied to the potentiometer winding 223. The wiper 224 is adjusted to select a voltage proportional to the time of fall $t$ for the particular altitude of the vehicle. The voltage selected will be proportional to $-\overline{R}t$.

A source of voltage 225 has the negative pole connected to one end of the potentiometer winding 226. The other end of the winding 226 and the positive pole of the source 225 are grounded. The wiper 227 is adjusted to select a voltage proportional to the proper trail T for the speed and elevation of the vehicle. This voltage is applied to the mid-point of the potentiometer winding 228 which is similar to the winding 205. The wiper 229, like the wiper 207, is moved proportionally to the angle $\theta$, and is insulated from the drive shaft. The wiper 229 thus selects a voltage proportional to $-T\cos\theta$. The wiper 227, and the wiper 220 may be ganged to move simultaneously.

The source of voltage 225 also has the negative pole connected to a potentiometer winding 230. The other end of winding 230 is grounded. The wiper 231 is moved by the motor 46, Fig. 7, proportionally to the horizontal range to select a voltage proportional to —R. The wiper 231 is insulated from the drive shaft.

The voltage selected by the wiper 224, proportional to $-\bar{R}t$; the voltage selected by the wiper 229, proportional to —T cos θ; and the voltage selected by the wiper 231, proportional to —R are respectively supplied, through resistors 232, 233, 234, to the release circuit 235, which may be of the type shown in Fig. 15, and which sums up the applied voltages. The output of the release circuit 235 is thus proportional to $R+T \cos \theta + \bar{R}t$, Equation 2. When this voltage falls to zero, a relay or latch 236 in the output of the release circuit 235 is released to drop the bomb. A meter may also be connected to the output of the release circuit to indicate the approach to the correct release point.

The summing amplifiers 116, 122 of Fig. 10; 173, 182, 196, 202 of Fig. 11 and 210, of Fig. 12 may all be of the type shown in Fig. 13.

In Fig. 13, the signal voltages are applied to the control grid of the upper section of the twin vacuum tube 240. The source 241 supplies anode current through the coupling resistor 242. The source 243 supplies current to the anode of the lower section, which is connected so as to reduce drift due to variations in cathode activity as described in an article "Sensitive D, C. amplifier with A. C. operation" by S. E. Miller, published in Electronics, November 1941, page 27. The combined anode currents flow through the resistor 244, which is of fairly high resistance. The source 245 impresses a potential with respect to ground which opposes the potential due to the voltage drop in the resistor 244. The resistor 244 may be varied to adjust the space currents in the vacuum tube 240.

The control grid of the vacuum tube 246 is directly connected to the anode of the upper section of the vacuum tube 240 and is thus at a positive potential with respect to ground. The cathode of the vacuum tube 246 is therefore connected to the source 243 so that the potential difference between the control grid and cathode of the vacuum tube 246 is of suitable value.

The vacuum tube 246 is coupled to the vacuum tube 247 by an interstage network of the type shown in United States Patent 1,751,527, March 25, 1930, H. Nyquist. The anode circuit is supplied from the source 241, and the grid bias from the source 245. The vacuum tube 247 is coupled to the vacuum tube 248 by a similar interstage coupling network.

A portion of the output voltage of the vacuum tube 246 is tapped at the point 249 and supplied to the grid of the vacuum tube 250. Thus, the direct signals are supplied to the grid of vacuum tube 250; while vacuum tube 247 acts as a phase inverter and amplifier to supply signals of reversed polarity to the grid of vacuum tube 248.

The control grids of the vacuum tubes 247, 250 are biased to a fairly high negative voltage with respect to ground, and this voltage is largely compensated by a negative bias applied to the cathodes of the vacuum tubes 247, 250 by the source 251.

Positive potential from the source 243 is supplied by connection 253 to the anode of vacuum tube 248. The cathode of vacuum tube 248 is connected to terminal 252 and to the cathode of vacuum tube 250. The cathode of vacuum tube 250 is connected to the negative pole of the source 251. The positive pole of source 251 and the negative pole of source 243 are grounded. If the vacuum tubes 248 and 250 have the same anode-cathode resistance, and the sources 243, 251 are of the same potential, or if the ratio of the anode-cathode resistances of the vacuum tubes 248, 250 is the same as the ratio of the potentials of the sources 243, 251, these four elements will form a bridge, and in the absence of an applied signal the terminal 252 and ground are conjugate to each other, that is, the terminal 252 is at ground potential.

If a negative signal voltage be applied to the control grid of the vacuum tube 250, an inverted signal will be applied to the vacuum tube 248, the anode-cathode resistance of vacuum tube 250 will increase and the anode-cathode resistance of vacuum tube 248 will decrease, thus unbalancing the bridge and causing a potential to appear at the terminal 252. To counteract the tendency of this potential toward diminishing the response of tube 248, the signal voltage applied to the grid of this tube must be larger than that applied to the grid of tube 250. This condition is brought about by the amplification in the stage which includes tube 247.

The screen grid of tube 248 is connected to source 241 and the screen grid of tube 250 is connected to source 243. The cathodes are heated in known manner (not shown).

Using commercial radio receiving tubes, the source 241 may be about positive 270 volts, the source 245 about negative 270 volts, the source 243 about positive 100 volts and the source 251 about negative 100 volts, all with respect to ground.

A negative voltage applied to terminal 254 will decrease the anode-cathode current of tube 240, decreasing the voltage drop in resistor 242, increasing the positive potential of the control grid of tube 246. Increasing the positive potential of the grid of tube 246 will increase the anode-cathode current, increasing the voltage drop in the coupling resistors, and reducing the positive potential applied to the control grid of tube 247, and of point 249 connected to the control grid of tube 250. As a reduction of positive potential is equivalent to an increase of negative potential, the variation in potential of the control grid of tube 250 is of the same polarity as the voltage applied to the terminal 254. An increase in negative potential on the grid of tube 247 reduces the anode-cathode current, reducing the voltage drop in the coupling resistors and increasing the positive potential of the grid of tube 248. The increased negative potential on the grid of tube 250 will reduce the anode-cathode current while the increased positive potential on the grid of tube 248 will increase the anode-cathode current; thus, current will flow from terminal 252 through an attached load to ground. Thus, if a negative voltage is applied to terminal 254, a positive voltage appears on terminal 252, or the polarity of the applied signal is reversed by the amplifier.

When a feedback resistor is connected between terminal 252 and terminal 254 and a plurality of voltages are applied through individual resistors, as shown, for example, in connection with repeaters 196, 202, Fig. 11, the negative feedback will reduce the apparent input impedance of the repeater to a very low value, so that the various sources do not interact on each other, and the gain of the repeater, for any given source, will be controlled by the ratio of the resistance in the feedback path to the resistance in series with the source.

The summing amplifier 215 and steering circuit 221 of Fig. 12 are shown in detail in Figs. 14 and 14A.

The resistors 213, 214, Fig. 12, are connected to terminal 255, Fig. 14, which is connected to the control grid of the lower section of the twin triode 256. The positive pole of a voltage source 257 is applied to the anode of this section. The cathode of the tube 256 is connected through a resistor 258 and a negative voltage source 259 to ground. The control grid of the upper section is connected to ground, and current from a positive voltage source 260 is supplied through resistor 261 to the anode of the upper section. Assume a negative voltage is applied to terminal 255, decreasing the anode current of the lower section and decreasing the voltage drop in resistor 258. The cathode of tube 256 then has a negative potential with respect to ground, which is equivalent to a positive potential on the control grid of the upper section. The lower section of tube 256 thus operates as an inverter to impress on the control grid of the upper section a voltage having a polarity which is reversed with respect to the applied voltage. The polarity is again reversed in the upper section so that the voltage on the grid of the tube 262 is of the same polarity as the signal. This voltage is again reversed by the tube 262 so that the voltage on the grid of vacuum tube 263 is of a polarity reversed with respect to the applied signal.

The cathode of vacuum tube 263 is connected to ground through the potentiometer windings 216, 219, Fig. 12, in parallel relationship.

The negative pole of voltage source 259 is connected through resistor 264 to the cathode of vacuum tube 263. The positive pole of the source of voltage 260 is connected by connection 265 directly to the anode of vacuum tube 263. The negative pole of voltage source 259 and the positive pole of voltage source 260 are grounded.

The resistance of the resistor 264 is selected so that, in the absence of an applied signal, the sources 259, 260, the resistor 264 and the anode-cathode resistance of vacuum tube 263 form a balanced bridge; thus point 266 is conjugate with respect to ground and no voltage is applied to windings 216, 219.

Assuming a negative voltage to be applied to terminal 255, this will cause a positive voltage to be applied to the control grid of the vacuum tube 263, increasing the anode-cathode current of vacuum tube 263 and unbalancing the bridge. The point 266 will become positive with respect to ground, that is, the wiper 217 will become positive with respect to ground. Wiper 217 is connected by terminal 267, through resistor 218, Fig. 12, to terminal 255 and the control grid of vacuum tube 256. Thus, a negative voltage with respect to ground applied to the control grid of vacuum tube 256 produced a voltage on wiper 217 which was positive with respect to ground, and this voltage was applied to the same control grid, forming a reverse or negative feedback.

The unbalance voltage between the point 266 and ground, due to a voltage applied to terminal 255, is also applied to the potentiometer winding 219, shown in Fig. 12. The voltage selected by the wiper 220 is applied to the control grid of vacuum tube 268.

The voltage from the connection 198, Fig. 12, is applied through terminal 269 to the control grid of a vacuum tube 270.

Positive voltage from the source 260 is supplied by connection 265 through resistors 271, 272 to the anode of vacuum tube 268; and through resistors 273, 274 and meter 275 to the anode of vacuum tube 270.

The cathodes of vacuum tubes 268, 270 are connected through resistor 276 and a negative voltage source 277 to ground and the negative pole of source 260. The anode-cathode resistances of the vacuum tubes 268, 270 with resistors 271, 272, 273, 274 and meter 222 form a bridge which, in the absence of a signal voltage, is balanced. The meter 222 has a center zero for normal value of anode current in vacuum tube 270 and this zero may be accurately set by adjusting resistor 274.

Assuming that vacuum tubes 268 and 270 are of the same type, having the same mutual conductances and internal impedances; that the product of the mutual conductance of a tube and the internal impedance is large compared to unity; that the product of the mutual conductance of a tube and the resistance of resistor 276 is also large compared to unity; that the resistance of resistors 271, 272 equals the resistance of resistors 273, 274, and is large compared to the internal impedance of the tubes, then, it may be shown that the unbalance voltage sending current through 273, 274, and meter 222 equals $$g\frac{R}{2\left(1+\frac{R}{R_i}\right)}(V_1-V_2)$$

where $g$ is mutual conductance of tubes,
$R_i$ is internal impedance of tubes,
$R$ is resistance of resistors 271 and 272,
$V_1$ is voltage applied by wiper 220,
$V_2$ is voltage applied by terminal 269.

The voltage applied by the wiper 220 is proportional to $$\frac{T}{R}(\overline{R\delta}\cos\theta+\overline{R}\sin\theta)$$

and the voltage from connection 198, Fig. 12, applied to terminal 269 is proportional to $-\overline{R\delta}$. These voltages are equal, and vary equally, when the airplane is flying on the correct track, and the needle of the meter 222 reads in the center. If these voltages are not equal, then the needle of the meter 222 will be deflected from zero.

The release circuit, designated 235 in Fig. 12, is shown in detail in Fig. 15. The resistors 232, 233, 234, Fig. 12, are connected to terminal 280 of Fig. 15, terminal 281 being grounded. The voltage applied to the control grid of the upper section of vacuum tube 282 is thus proportional to $-\overline{R}t-T\cos\theta-R$, and this negative voltage on the control grid of vacuum tube 282, reduces the anode current of vacuum tube 282 to a small value. The anode current of vacuum tube 282 is supplied by voltage source 283 through the anode coupling resistor 284. The lower section of the twin triode vacuum tube 282 is connected like the lower section of vacuum tube 240, Fig. 13, to compensate for cathode temperature drift.

The voltage applied to terminal 280 is amplified by the upper sections of the twin triode vacuum tubes 282, 287 and supplied to the control electrode of the gas-filled triode 289. A positive voltage from the source 290 is applied to the cathode of the gas-filled triode 289, to produce a negative bias on the control electrode. The negative bias from the source 290, with the negative amplified signal, holds the tube 289 inoperative until the amplified signal falls to zero, reducing the negative bias on the control electrode of the gas-filled triode 289 and permitting the tube to fire.

Current from the source 283 is supplied by connection 291, key 292 and resistor 293 to charge capacitor 294. When the gas-filled tube 289 fires, the capacitor 294 discharges through the relay or latch winding 236 and tube 289, energizing the winding 236 and releasing the bomb. The discharge of capacitor 294 permits current to flow from source 283 through resistor 293, causing a voltage drop across resistor 293 which lights a small neon lamp 295, or other indicator, to indicate the release of the bomb. Upon completion of the bombing run, when the control electrode of the gas-filled triode 289 is again biased negatively, the key 292 is operated, breaking the circuit from the source 283 and permitting the tube 289 to restore.

The voltage applied to the terminal 280 releases the bomb when $-\bar{R}t - T \cos \theta - R = 0$, which is the correct release condition, but if no precautions were taken, the bomb might be released when the airplane was not headed properly. The steering circuit of Fig. 14A is arranged to block the bomb release circuit of Fig. 15 at all times when the airplane is off the correct track.

The anodes of a double diode vacuum tube 296 are connected to the outer ends of the resistors 271, 273, Fig. 14A. The outer ends of two equal resistors 297, 279 are also connected respectively to the anodes of tube 296. The junctions of resistors 297, 279 are connected through resistor 298 to the cathode of tube 296.

When the airplane is on the correct track, equal voltages are applied to the control electrodes of vacuum tubes 268, 270, and assuming the resistances of resistors 272, 274 are equal and the resistances of resistors 271, 273 are equal, equal voltages are applied to the anodes of tube 296. As the resistors 297, 279 are equal, no current flows in tube 296. When the airplane is off the correct track, the voltages applied to the control grids of the vacuum tubes 268, 270 are not equal, and the anode-cathode currents are not equal. Assume the anode-cathode current of tube 268 to decrease while the anode-cathode current of tube 270 increases. The decreased current in resistor 271 will permit the positive potential of the outer end of resistor 271 to rise, while the increased current in resistor 273 will cause the positive potential of the outer end of resistor 273 to fall. Current can then flow from the lower anode of tube 296 to the cathode and through resistors 298, 297.

Similarly, when the anode-cathode current of tube 268 increases while the anode-cathode current of tube 270 decreases, then current can flow from the upper anode of tube 296 to the cathode and through resistors 298, 279. Thus, whenever the airplane is off the correct track, the cathode of tube 296 and the free end of resistor 298 become more positive with respect to ground. This potential will appear on terminal 299, which is connected to terminal 300, Fig. 15.

Terminal 300 is connected through resistor 301 to a resistor 302 connected to the control electrode of the lower section of the twin triode 287.

The negative pole of the voltage source 288 is also connected through resistor 303 to resistor 302. The potential of source 288 is selected so that, when the airplane is on course, the anode-cathode current of tube 287 is small. When the airplane is off course, the positive potential developed across resistor 298, Fig. 14A, is applied through resistors 301, 302 to the control electrode of the lower section of tube 287, and causes the anode-cathode current of tube 287 to increase.

The source 290 is connected through the winding of relay 304 to the anode of the lower section of tube 287. When the airplane is on course, the anode-cathode current of tube 287 is too small to operate relay 304. When the airplane is off the correct track, this anode current increases, operating relay 304 and connecting negative voltage from the source 285 to the control grid of the gas-filled triode 289, preventing the triode 289 from firing and releasing the bomb. Thus, even if the release voltages have fallen to the correct value, the bomb cannot be released, unless, at the same time, the airplane is on the correct track.

What is claimed is:

1. In a computer for an aerial vehicle, a source of voltage varying with the component of air speed of said vehicle along an arbitrary axis, a second source of voltage varying with the horizontal displacement of said vehicle along said axis, an amplifier having an input and an output circuit, means for connecting said first source of voltage to the input circuit of said amplifier, means including a series capacitor for connecting said second source of voltage to the input circuit of said amplifier, and a feedback path from the output circuit to the input circuit of said amplifier including capacitor means varied in capacity with the displacement of said vehicle.

2. In a computer for an aerial vehicle, a source of voltage varying with the component of air speed of said vehicle along an arbitrary axis, a second source of voltage varying with the horizontal displacement of said vehicle along said axis, said voltages containing random errors, an amplifier having an input and an output circuit, means for connecting said first source of voltage to the input circuit of said amplifier, means including a series capacitor for connecting said second source of voltage to the input circuit of said amplifier, a resistor connected from the output circuit to the input circuit of said amplifier, and means including a second capacitor connected from the output circuit to the input circuit of said amplifier, whereby the random fluctuations in said applied voltages are smoothed to the most probable values in the output of said amplifier.

3. In a computer for an aerial vehicle, means on said vehicle for observing an object on the earth including a shaft rotated proportionally to the horizontal distance from the vehicle to the object, a pair of potentiometers having uniform windings and wipers moved by said shaft, two sources of voltages of opposite polarity respectively connected across said windings, gyroscopic means for maintaining an arbitrary axis fixed in space, means associated with said gyroscopic means including a second shaft rotated proportionally to the angle between said axis and the vertical plane including said vehicle and said object, a third potentiometer having a winding varying in resistance with a sinusoidal function and a third wiper moved by said second shaft, the wipers of said pair of potentiometers being respectively connected to the winding of said third potentiometer, means associated with said gyroscopic means including a third shaft rotated proportionally to the angle between said axis and the axis of said vehicle, a fourth potentiometer having a winding varying in resistance with a sinusoidal function and a fourth wiper moved by said third shaft, a second pair of potentiometers having uniform windings connected respectively to said sources of voltages and a pair of wipers adjusted to the air speed of said vehicle respectively connected to the winding of said fourth potentiometer, an amplifier having an input and an output circuit, and means connecting said third and fourth wipers to the input circuit of said amplifier whereby the voltage of the output circuit of said amplifier is varied proportionally to a component related to said axis of the velocity of the air relative to said object.

4. In a computer for an aerial vehicle, a source of voltage proportional to the component along an arbitrary axis of the vector velocity of the air with respect to a target, a first potentiometer having a winding varying in resistance with a sinusoidal function connected to said source and a wiper, a second source of voltage proportional to the component normal to said axis of the vector velocity of the air, a second potentiometer having a winding varying in resistance with a sinusoidal function connected to said second source and a second wiper, motor means gyroscopically controlled to move both said wipers proportionately to the angle between said axis and the vertical plane including said vehicle and said target, a third source of voltage proportional to the air speed of said vehicle, a third potentiometer having a winding varying in resistance with a sinusoidal function connected to said third source and a third wiper, motor means moving said third wiper proportionately to the angle between the axis of said vehicle and the vertical plane including said vehicle and said target, a reverse feedback amplifier having an input and an output circuit, a plurality of resistors, and means for connecting said wipers individually through one of said resistors to the input circuit of said amplifier whereby the voltage of the output circuit of said amplifier is varied proportionally to a component related to said axis of the ground speed of said vehicle.

5. In a computer for an aerial vehicle, a source of voltage with respect to ground proportional to the smoothed vector velocity of the air along an arbitrary axis, a first potentiometer having a sinusoidally varying winding grounded at diametrically opposite points and a wiper, means for connecting said source to a tap in said winding midway between said grounds, a reverse feedback amplifier adapted to reverse the polarity of the input voltage, means for connecting said source through said amplifier to a tap diametrically opposite said first tap, a second source of voltage with respect to ground proportional to the smoothed vector velocity of the air transverse to said axis, a second potentiometer having a cosinusoidally varying winding grounded at diametrically opposite points and a second wiper, means for connecting said second source to a tap in said second winding midway between said grounds, a second reverse feedback amplifier adapted to reverse the polarity of the input voltage, means for connecting said second source through said second amplifier to a tap in said second winding diametrically opposite said first tap, a third potentiometer having a sinusoidally varying winding grounded at diametrically opposite points and a third wiper, two sources of equal voltage with respect to ground but of opposite polarity and proportional to the air speed of said vehicle respectively connected to taps on the winding of said third potentiometer midway between said grounds, motor means for moving said first and second wipers through the angle between said axis and the plane containing said vehicle and an object, means for moving said third wiper through the angle between the axis of said vehicle and said plane, a summing amplifier having an input and an output circuit, a plurality of resistors, and means for connecting said wipers respectively through one of said resistors to the input circuit of said summing amplifier whereby the voltage of the output circuit of said amplifier is varied proportionally to a component related to said axis of the ground speed of said vehicle.

6. In a computer for an aerial vehicle, a source of voltage proportional to the smoothed vector velocity of the air with respect to a target along an arbitrary axis, potentiometer means associated with said source for selecting a voltage proportional to the component of said velocity in the plane between said vehicle and said target, a second source of voltage proportional to the smoothed vector velocity of the air with respect to said target transverse to said axis, second potentiometer means associated with said second source for selecting a voltage proportional to the component of said latter velocity in said plane, a third source of voltage proportional to the vector velocity of said vehicle with respect to the air, third potentiometer means associated with said third source of voltage for selecting a voltage of opposite polarity to said other selected voltages proportional to the component of said last velocity in said plane, a reverse feedback amplifier, three resistors, and means for connecting each of said selected voltages individually through one of said resistors to the input of said amplifier, whereby the output voltage of said amplifier is proportional to the horizontal ground speed in said plane of said vehicle with respect to said target.

7. In a computer for an aerial vehicle, a source of voltage proportional to the smoothed vector velocity of the air with respect to a target along an arbitrary axis, potentiometer means associated with said source for selecting a voltage proportional to the component of said velocity transverse to the plane between said vehicle and said target, a second source of voltage proportional to the smoothed vector velocity of the air with respect to said target transverse to said axis, second potentiometer means associated with said second source for selecting a voltage proportional to the component of said latter velocity transverse to said plane, a third source of voltage proportional to the vector velocity of said vehicle with respect to the air, third potentiometer means associated with said third source of voltage for selecting a voltage proportional to the component of said last velocity transverse to said plane, a reverse feedback amplifier, three resistors, and means for connecting each of said selected voltages individually through one of said resistors to the input of said amplifier, whereby the output voltage of said amplifier is proportional to the horizontal ground speed transverse to said plane of said vehicle with respect to said target.

SIDNEY DARLINGTON.
CHARLES H. TOWNES.
DEAN E. WOOLDRIDGE.

(References on following page)

REFERENCES CITED

The following references are of record in the file of this patent:

UNITED STATES PATENTS

| Number | Name | Date |
|---|---|---|
| 2,066,949 | Ruiz | Jan. 5, 1937 |
| 2,119,607 | Sterba | June 7, 1938 |
| 2,207,962 | Werrmann | July 16, 1940 |
| 2,251,973 | Beale et al. | Aug. 12, 1941 |
| 2,292,159 | Richardson | Aug. 4, 1942 |
| 2,297,543 | Eberharat et al. | Sept. 29, 1942 |
| 2,382,994 | Holden | Aug. 21, 1945 |
| 2,385,334 | Davey | Sept. 25, 1945 |
| 2,401,779 | Swartzel | June 11, 1946 |
| 2,404,387 | Lovell et al. | July 23, 1946 |
| 2,412,585 | Klemperer et al. | Dec. 17, 1946 |

FOREIGN PATENTS

| Number | Country | Date |
|---|---|---|
| 164,765 | Great Britain | June 23, 1921 |